United States Patent [19]
Taylor

[11] 3,942,009
[45] Mar. 2, 1976

[54] DIRECTIONAL RADIATION DETECTOR
[75] Inventor: Allen L. Taylor, Woodbury, Minn.
[73] Assignee: Minnesota Mining and Manufacturing Company, St. Paul, Minn.
[22] Filed: Aug. 23, 1974
[21] Appl. No.: 500,147

[52] U.S. Cl. .............................................. 250/338
[51] Int. Cl.² .......................................... G01T 1/16
[58] Field of Search .......... 250/338, 363, 339, 340; 136/213, 214

[56] References Cited
UNITED STATES PATENTS

| | | |
|---|---|---|
| 3,412,246 | 11/1968 | Horwitz et al. ..................... 250/363 |
| 3,571,592 | 3/1971 | Glass .................................. 250/338 |
| 3,769,096 | 10/1973 | Ashkin et al. .................... 250/338 X |
| 3,813,550 | 5/1974 | Abrams et al. ..................... 250/338 |
| 3,831,029 | 8/1974 | Jones et al. ......................... 250/338 |

Primary Examiner—Davis L. Willis
Attorney, Agent, or Firm—Alexander, Sell, Steldt & DeLaHunt

[57] ABSTRACT

A directional radiation detector having a pyroelectric sensing medium for responding to radiation and a directional screen formed of a panel with a plurality of axial passages that restrict the radiation viewing angle of the detector.

2 Claims, 2 Drawing Figures

DIRECTIONAL RADIATION DETECTOR

BACKGROUND OF THE INVENTION

1. Field of the Invention

The present invention relates in general to radiation detectors and more specifically to such detectors that have a directional screen.

2. Description of the Prior Art

There are a number of radiation detectors presently known in the art but the operation of such known detectors is hinged upon the use of a small area sensing medium such as a crystal. Because of the small size of the sensing medium of such known detectors, sufficient radiation exposure of the sensing medium is difficult to achieve without resorting to special equipment. For example, to increase the amount of radiation exposure of the sensing medium often small area detectors include a lens or spherical mirror to focus a large amount of radiation on the sensing medium. Although such focusing means has proved operationally satisfactory, the use of a focusing lens or spherical mirror is relatively expensive and adds considerably to the price of a detector. To avoid the need of a focusing means, the present invention employs a large area sensing medium in the form of a layer of pyroelectric material. However, one problem with the use of a detector with a large area sensing medium is that the directionality of the detector is significantly reduced and, consequently, the field of view of the detector is too large for many purposes.

Various types of shields or screens for providing a directional capability are known in the art as evidenced by U.S. Pat. Nos. 3,821,463; 3,546,359; 3,584,134; and 3,231,663. However, such patents do not disclose the use of such shields or screens for providing a detector with directional capabilities and in spite of such art the need still exists for a directional radiation detector that is of a convenient size for portable use and yet is relatively inexpensive and simplistic in construction.

SUMMARY OF THE INVENTION

The present invention provides a radiation detector having a pyroelectric sensing medium layer that produces electrostatic charges on its surfaces when temperature varied, a conductive electrode on each surface of the sensing medium, sensing circuitry connected between the conductive electrodes for detecting and indicating electrostatic charges thereon and a directional screen that restricts the field of view that the detector has for sensing radiation.

In a preferred embodiment the components of the detector are located in a housing having an open front end in which the screen means is disposed. The walls of the housing are radiation absorbent or reflective to insure that radiation may enter the housing only through the directional screen. A panel forms the directional screen and includes a plurality of axial passages therethrough, which passages serve to restrict the viewing angle of the detector. The sensing medium and conductive electrodes are positioned directly behind the directional screen so that only radiation passing through the directional screen will affect the sensing medium. Accordingly, by increasing or decreasing the dimensions of the passages in the panel of the directional screen, the detector may be designed for particular fields of view that are required for specific applications.

The foregoing and other advantages of the present invention will appear from the following description. In the description reference is made to the accompanying drawings, which form a part hereof, and in which there is shown by way of illustration, and not of limitation, a specific form in which the invention may be embodied. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENTS

Figure 1:
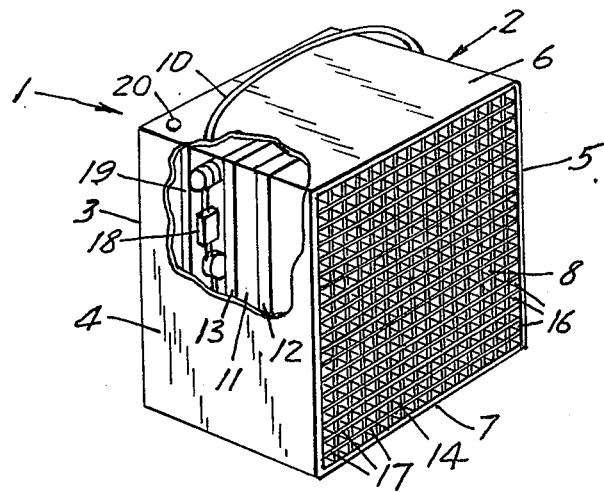
FIG. 1 is a perspective view in elevation of a preferred embodiment of a detector of the present invention.

Referring now to the drawings and with specific reference first to FIG. 1, a detector 1 represents a presently preferred embodiment of the present invention. The detector 1 is particularly suited for use as a heat detector by sensing infrared radiation, but it may be equally useful for detecting other types of radiation.

The detector 1 includes a rectangular shaped housing 2 having a back wall 3, a pair of opposite sidewalls 4 and 5, a top wall 6, a bottom wall 7, and an open front end 8. The dimensions and shape of the housing 2 are a matter of choice and the housing 2 can be of another shape such as a cylinder. The walls of the housing 2 are formed or coated with a material that may be radiation absorbent or reflective to serve as a shield for preventing radiation from passing therethrough. A strap handle 10 is shown attached to the housing top wall 6 to serve for hand carrying the detector 1; however the handle 10 is not essential to the present invention and instead a pistol handle or other such handling means may be attached to the housing 2 to facilitate its portability.

Contained in the housing 2 is a nonconductive, poled, pyroelectric sensing medium 11 that is sandwiched between front and back layers of conductive material 12 and 13 respectively, which layers are affixed in surface-to-surface contact with the front and back surfaces of the medium 11. Forming the medium 11 is preferably a material such as polyvinylidene fluoride or other such polymeric material having pyroelectric properties. Poled, pyroelectric materials exhibit the unique characteristic of developing electrostatic charges on their planar surfaces when subjected to a variation in temperature, with the charges developed on one surface opposite in polarity to those developed on the other surface. The conductive layers 12 and 13 serve as electrodes for collecting any electrostatic charges developed on the surfaces of the pyroelectric medium 11 for the reason that the medium 11 is nonconductive. Preferably the front surface of the conductive layer 12 is coated with a flat black paint (such as produced by Minnesota Mining and Manufacturing Company under the trademark "Nextal") to increase its radiation absorbency.

Figure 2:
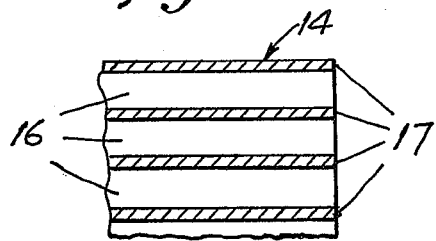
FIG. 2 is a fragmentary cross section side view in elevation of a front panel of the detector of FIG. 1.

Disposed in the open front end 8 of the housing 2 is a panel 14 that serves as a directional screen and is juxtaposed with the conductive layer 12. The panel 14 is formed in honeycomb fashion, as shown most clearly in the fragmentary view of FIG. 2, with a plurality of axial passages 16 aligned perpendicular to the layer 12 and defined by thin divider walls 17. The panel 14 may be formed from paper, metal, wood or various other materials that are radiation absorbent, or are coated with such a substance. The panel 14 serves to restrict the viewing angle of the detector 1 and thereby limits the amount of radiation that enters the housing open end 8. In general, the dimensions and shape of the panel 14 are not critical and depend primarily on the degree of directionality that is required for a particular application. For example, decreasing the diameter of the passages 16 while increasing their length will serve to make the panel 14 more directional. In fact, the panel 14 may be designed so that the radiation from the area of temperature variation will only strike the conductive member 12 when the open end of the detector housing is pointed directly at such area.

By the use of panel 14, the detector 1 may be used to scan a large structure such as a wall or ceiling, in search of areas of temperature variation and to pinpoint such areas. If, for example, an area of temperature variation is a hot spot, the rays from such spot will heat up the conductive layer 12, which in turn causes a heat rise of the sensing medium 11. Thus, electrostatic charges develop on opposite surfaces of the medium 11 and the conductive layers 12 and 13 serve to collect such charges.

A sensing circuit 18 is mounted on a printed circuit board 19 next to the conductive layer 13 and is electrically connected across the layers 12 and 13 for responding to the development of electrostatic charges on the surfaces of the medium 11. The response of the sensing circuit may be visually monitored either by a meter (not shown), or by the lighting of a bulb 20 mounted on the housing top wall 6 for indicating that the detector 1 has sensed a temperature variation.

Thus, the present invention provides a relatively simplistic means for detecting temperature variations of a structure and for pointing out their location. Moreover, the present invention is readily transportable and highly convenient to use.

What is claimed is:

1. A directional thermal detector for sensing temperature variations of a structure and comprising:

a layer of poled, polymeric pyroelectric, infrared radiation sensitive material that produces electrostatic charges on its surfaces when its ambient temperature is varied, the charges produced on one surface of said layer being opposite in polarity to the charges on the opposite surface of said layer;

a first layer of electrically conductive material carried on said one side of said pyroelectric layer to serve as an electrode for collecting the electrostatic charges produced on said one side;

a second layer of electrically conductive material carried on said opposite side of said pyroelectric layer to serve as an electrode for collecting the electrostatic charges on said opposite side;

sensing circuitry connected across said first and second conductive layers for detecting and indicating electrostatic charges thereon;

shield means for insulating said opposite side of said pyroelectric layer from exposure to infrared radiation; and directional screen means that includes a panel juxtaposed with said first conductive layer and having a plurality of axial passages aligned perpendicular to said conductive layer for limiting the exposure of said conductive layer to infrared radiation from the structure being detected, and thereby restrict the viewing angle of the detector.

2. A detector as recited in claim 1 wherein said pyroelectric layer is formed from polyvinylidene fluoride.

* * * * *